April 30, 1946.    T. O. BRANDON    2,399,199
QUICK, HIGH PRECISION BALL RELEASING MECHANISM
Filed Jan. 10, 1944    6 Sheets-Sheet 2

INVENTOR.
THOMAS O. BRANDON
BY

April 30, 1946.  T. O. BRANDON  2,399,199
QUICK, HIGH PRECISION BALL RELEASING MECHANISM
Filed Jan. 10, 1944  6 Sheets-Sheet 3

*INVENTOR.*
THOMAS O. BRANDON
BY
*ATTY.*

April 30, 1946.   T. O. BRANDON   2,399,199
QUICK, HIGH PRECISION BALL RELEASING MECHANISM
Filed Jan. 10, 1944   6 Sheets-Sheet 4

INVENTOR.
THOMAS O. BRANDON
BY
ATTY.

April 30, 1946.  T. O. BRANDON  2,399,199
QUICK, HIGH PRECISION BALL RELEASING MECHANISM
Filed Jan. 10, 1944  6 Sheets-Sheet 6

INVENTOR.
THOMAS O. BRANDON
BY
ATTY.

Patented Apr. 30, 1946

2,399,199

UNITED STATES PATENT OFFICE 2,399,199

QUICK, HIGH PRECISION BALL RELEASING MECHANISM

Thomas O. Brandon, United States Navy

Application January 10, 1944, Serial No. 517,639

7 Claims. (Cl. 206—42)

(Granted under the act of March 3, 1883, as amended April 30, 1928; 370 O. G. 757)

This invention relates to a ball releasing mechanism, and more particularly to a ball releasing mechanism adapted to be used in combination with a sextant for measuring the altitude of a celestial body by using for reference the line of fall of a small ball protected from air currents and outside interference. The particular sextant to which reference is made is known as the Hagner averaging sextant, and is of the type shown in the Hagner Patent No. 2,219,990, wherein a steel ball is held by an electro-magnet which is deenergized when it is desired to release the ball.

Tests made of the mechanically releasing device of my invention and of a magnetic release for the ball, showed that a magnetic release is not as capable of high precision operation while tilting the apparatus at various degrees of inclination.

While the averaging sextant shown in the Hagner Patent No. 2,219,990 is disclosed as an example of the type of device to which my device can be adapted, it is to be understood that the field of use of my invention is not limited to that use, but that it can be used wherever a precise, quick acting release is desired.

It is a primary object of my invention to provide an improved quick acting ball release device of high precision.

Another important object of my invention is the provision of a mechanical ball release mechanism which will accurately release a ball to fall vertically from its suspended position.

It is another object of my invention to provide a ball release mechanism wherein a plurality of movable members support a ball for release and are quickly and simultaneously withdrawn with a practically instantaneous snap action whereby the ball is instantly released to fall freely downward.

Other objects will become apparent as the description progresses, and in connection with the drawings wherein.

Figure 1:
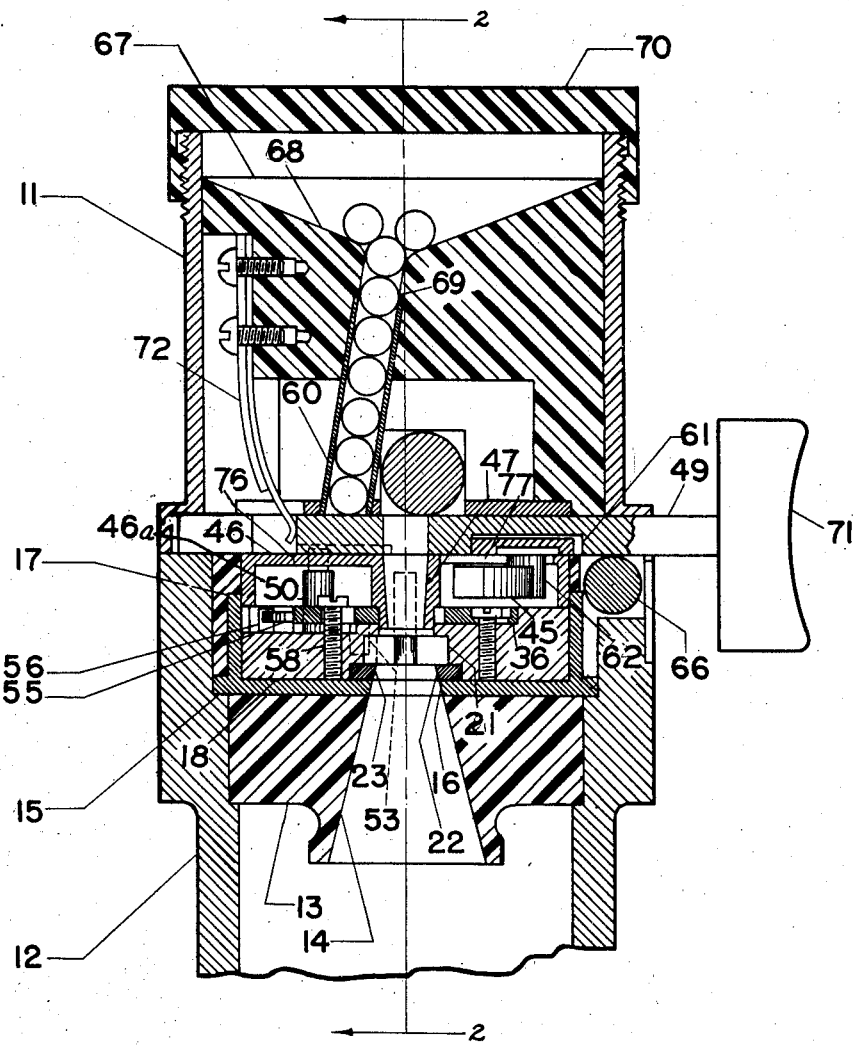
Fig. 1 is an elevation in section of an embodiment of the invention.

The mechanism is enclosed within a substantially cylindrical casing having an upper part 11 and a lower part 12 which are fastened together in proper alignment by any suitable means, not shown. Seated on an internal shoulder in the lower casing 12 is a member 13 having a central conical passageway 14. Resting on the member 13 and also on another internal shoulder in casing 12 is a disc shaped plate 15 having a central conical opening 16 which is in effect an extension of passageway 14 of member 12. Slightly spaced from the outer periphery of plate 15 is an integral vertically extending annular wall 17. The plate 15 with its annular wall 17 forms a support and locating means for a main assembly plate 18.

A pair of oppositely disposed releasing fingers 19 and 20 (Figs. 2, 4, etc.) are fitted to slide in a diametrically disposed slot 21 in the bottom of plate 18. One of the releasing fingers is shown in perspective in Fig. 6. A pair of parallel rails 22 and 23, which are spaced by a distance less than the width of the fingers 19 and 20, retain the said fingers in the slot 21. The rails are recessed in the bottom of plate 18 and fastened by screws 24.

Figure 2:
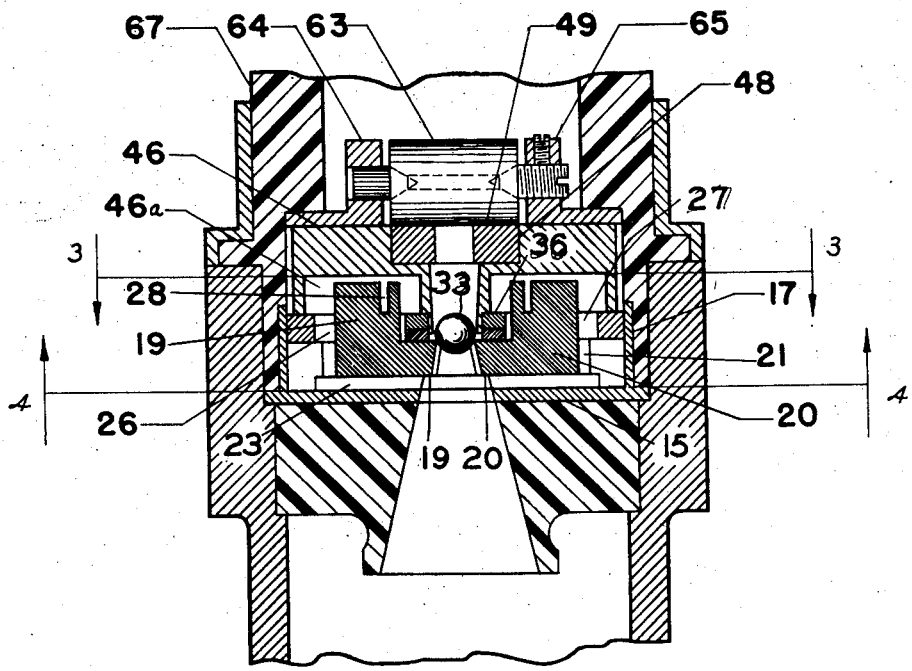
Fig. 2 is a sectional view of the device along the line 2—2 of Fig. 1.
Figure 6:
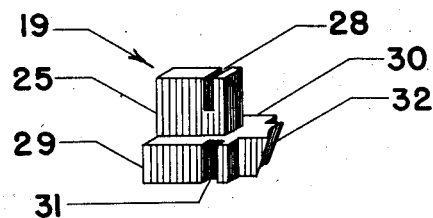
Fig. 6 is a view in perspective of another of the elements.
Figure 9:
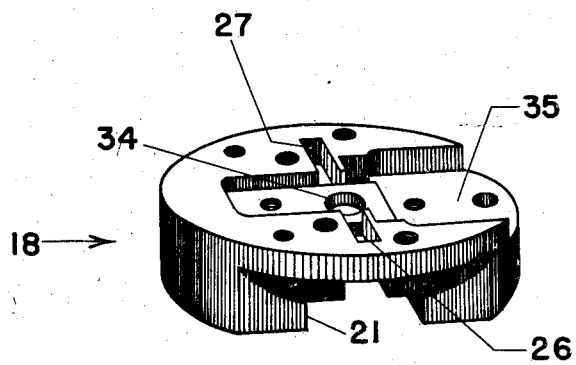
Fig. 9 is a pictorial view of the top side of the main assembly plate.

As best seen in Fig. 6 the fingers 19 and 20 have vertically extending walls 25 which extend through slots 26 and 27 (Figs. 2 and 9) in the top of plate 18. A slot 28 extends through the wall 25 of each of the fingers, for a purpose to be described. The lower part of the fingers includes oppositely disposed wings 29 and 30, and as shown in Figs. 4 and 6, one wing of each finger 18 and 19 is provided with a slot 31 for a purpose to be described. Also on the lower part of the fingers is a projection 32 which is tapered downwardly and rounded at its end as shown in Figs. 2, 3, 4 and 6. When the fingers 19 and 20 are at the inward end of their stroke, their projections 32 support a ball 33 as shown in Fig. 2, and when the fingers are moved apart, they release the ball, as will be described. The main assembly plate 18 has a central hole 34 through which the ball 33 drops before it is caught by the fingers 19 and 20.

Figure 11:
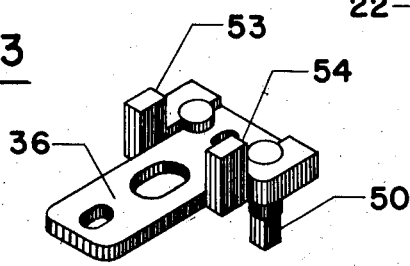
Fig. 11 is a pictorial view of a slider which in the assembled instrument moves in a groove in the top of the main assembly plate.
Figure 12:
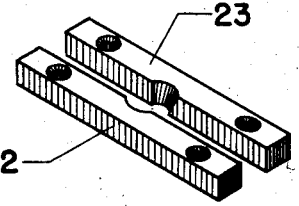
Fig. 12 is a pictorial view of a pair of rails which in the assembled instrument retain a pair of releasing fingers as shown in Fig. 6 in a slot in the main assembly plate.

On its upper side, the main assembly plate 18 has a groove 35 which is normal to slots 26 and 27. Seated in groove 35 is a slider 36 which is shown in section in Figs. 1 and 2, in plan in Fig. 3, and pictorially in Fig. 11. The slider 36 is wider and thicker on its sides at one end, as seen in Figs. 1, 11 and 3, and the groove 35 is similarly wider and deeper at that end to accommodate the slider, the top of the slider being substantially flush with the top of the assembly plate 18.

Figure 3:
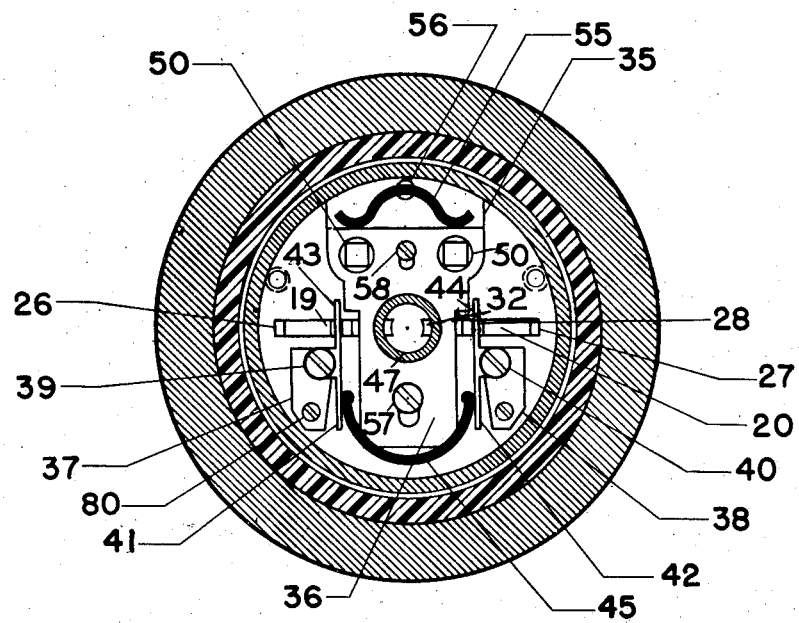
Fig. 3 is a sectional view of the device along the line 3—3 of Fig. 2, looking downward in the direction of the arrows.
Figure 13:
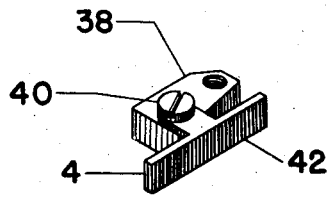
Fig. 13 is a pictorial view of a releasing lever and its mount.
Figure 4:
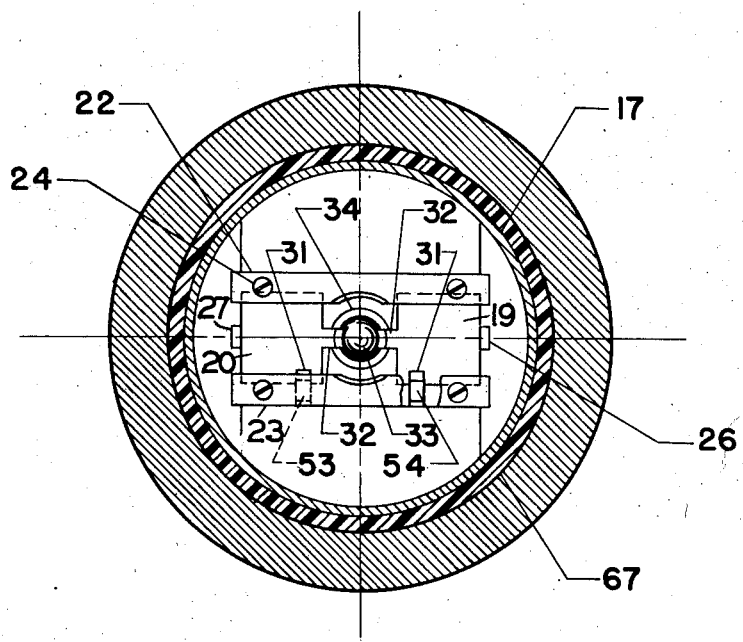
Fig. 4 is a sectional view, along the line 4—4 of Fig. 2, looking upward in the direction of the arrows.

Suitably attached to the top of the assembly plate 18, as by the screws 80 shown in Fig. 3, are mounts 37 and 38 which carry vertical posts 39 and 40. Pivotally mounted on posts 39 and 40 are a pair of releasing levers 41 and 42. Ends 43 and 44 of the releasing levers are engaged in the slots 28 of the releasing fingers 19 and 20, as shown in Fig. 3. When in the position shown in Fig. 3 the other ends of the levers 41 and 42 are engaged and spread apart by a release spring 45 and thus the releasing fingers 19 and 20 are at the inward ends of their movement, in which position they support the ball 33 as shown in Fig. 2. The slots 28 are shown in Fig. 2 without the releasing lever ends 43 and 44, but it should be understood that these ends do protrude through and engage the slots as clearly shown in Fig. 3.

Lying on top of and fastened to the main assembly plate 18 is a trigger plate 46 having a central hole 47 therethrough for the passage of the ball 33. On its upper side the plate 46 has a groove 48 in which the trigger 49 shown in perspective (in inverted position) in Fig. 5 slides. The top of the sliding trigger 49 is substantially flush with the top of the trigger plate 46.

On its lower side the trigger plate 46 has an annular recess 46a to accommodate the spring 45, releasing levers 41 and 42, etc.

Figure 7:
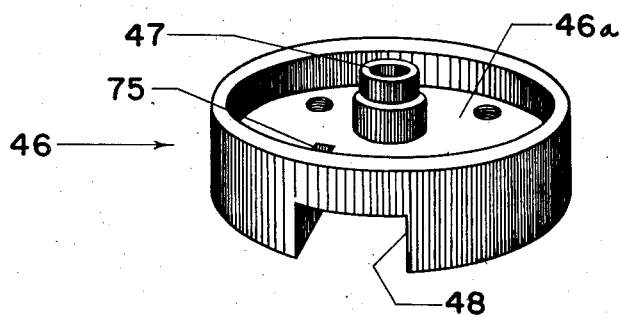
Fig. 7 is a pictorial view of the trigger plate showing its bottom side.
Figure 8:
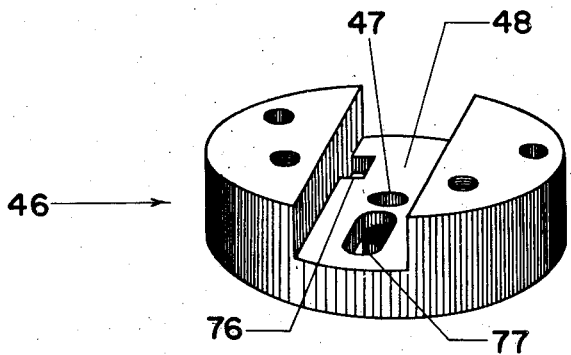
Fig. 8 is a pictorial view of the same trigger plate shown in Fig. 7, but showing its top side.
Figure 10:
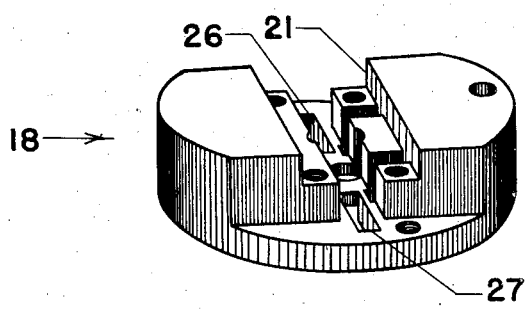
Fig. 10 is a pictorial view of the same assembly plate shown in Fig. 9, but inverted to show its bottom side.

The slider 36 has fastened to its top surface a pair of tripping posts 50 which protrude through slots 75 and 76 (Figs. 1, 7, and 8) in the trigger plate 46, and extend into grooves 51 and 52 in the bottom of the sliding trigger 49. On its bottom side the slider 36 has a pair of protruding triggers 53 and 54 (Figs. 4 and 11) which fit into the slots 31 in the wings 29 of the releasing fingers 19 and 20. The releasing fingers 19 and 20 are thereby prevented from movement by the engagement of triggers 53 and 54 with the slots 31, until the slider 36 in its movement to the left in Fig. 1, disengages the triggers 53 and 54 from slots 31.

A spring 55 located in one end of groove 55 is held at its midpoint by a post 56 on plate 18, and resiliently urges the slider 36 towards the bottom, as seen in Fig. 3. Screws 57 and 58 pass through slots in the slider 36 and hold it in its groove 35.

Figure 5:
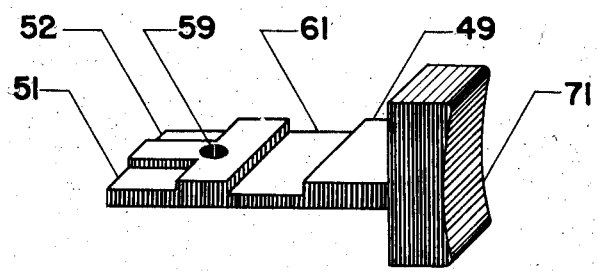
Fig. 5 is a view in perspective of one of the elements of the mechanism.

The sliding trigger 49, which is shown in section in Fig. 1 and in perspective but upside down in Fig. 5, has a hole 59 therethrough which carries a ball 33 from a magazine feed tube 60 to drop it through the hole 47 when the trigger reaches the end of its outer stroke. The trigger 49 is therefore thicker and hole 59 is larger than the diameter of the balls 33. On the underside of trigger 49, besides the grooves 51 and 52, is a transverse groove 61 in which is fastened a post 62 which carries the release spring 45. The spring 45 is in the recess 46a in the trigger plate 46, the post 62 extending through a slot 77 (Figs. 1 and 8) in the trigger plate. At its outer end, trigger 49 has a handle 71 which is pressed by the operator.

A roller 63 is mounted in supports 64 and 65 on the trigger plate 46, and contacts the upper surface of the sliding trigger 49. The lower surface of the sliding trigger is contacted by a roller 66. These rollers 63 and 66 assist in guiding the trigger 49.

An insert 67 fits into the upper casing 11 and extends partly into the lower casing 12. The insert has a dished upper surface 68 providing a receptacle for the balls 33, and terminating in a passageway 69 which connects with the upper end of the magazine feed tube 60. The top of the upper casing is closed by a screw cap cover 70. A leaf type spring 72 is fastened at one end to the insert and its free end engages the end of the sliding trigger 49 to urge it to the right as seen in Fig. 1.

*Operation*

As shown in Fig. 1 there are several balls in the magazine tube 60 and it will be assumed that there is also one resting on the releasing fingers 19 and 20 as shown in Fig. 2. When the operator is not depressing the handle 71, the sliding trigger 49 and the slider 36 are at their extreme right positions due to the action of springs 72 and 55 respectively. The releasing fingers 18 and 19 are both at their inward positions under the action of the release spring 45 and the releasing levers 41 and 42, and are at the same time prevented from separating by the fact that triggers 53 and 54 on the slider 36 are engaged in the slots 31 in the releasing fingers.

When the operator wishes to record the position of the sextant, or other device with which the instant invention can be used, he pushes the handle 71 inward. Spring 45 will thereby be pushed past the fulcrums 39 and 40 of levers 41 and 42 and will then act to separate the releasing fingers 19 and 20. However, the said fingers cannot separate until the triggers 53 and 54 are disengaged from the slots 31 in the fingers 19 and 20. The parts of the device are so dimensioned that the disengagement of triggers 53 and 54 occurs after the spring 45 passes the fulcrums 39 and 40, whereby the releasing fingers 19 and 20 fly apart substantially instantaneously to release the ball 33.

When the trigger 49 has reached the end of its inward stroke, the hole 59 therein is directly under the magazine feed tube 60 and one of the balls 33 from the feed tube drops into hole 59. As the operator releases the handle 71, spring 72 returns the sliding trigger 49 to its outermost position, and the ball 33 is dropped from hole 59 through the hole 47 and onto the releasing fingers 19 and 20, since at this time everything has been returned to the positions shown in the drawings. Tests of the device have shown that the releasing fingers 19 and 20 are withdrawn from under the ball in less than 0.0021 second which is less time than gravity takes to move the ball downward by an amount equal to the distance between its equator and the knife edged bearing arcs on the inner ends 32 of the releasing fingers 19 and 20.

The invention described herein may be manufactured and used by or for the Government of the United States of America for governmental purposes without the payment of any royalties thereon or therefor.

I claim:

1. Ball supporting and releasing means comprising a plurality of releasing fingers mounted for movement toward each other to a position where they are close enough to form spaced supports for a ball; resilient means operable to move said fingers toward or away from each other; and a trigger operable upon said resilient means to cause it to move said fingers toward or away from each other.

2. The device described in claim 1 wherein second trigger means are provided to prevent the movement of said fingers away from each other until said resilient means is fully effective to separate said fingers, whereby said fingers are snapped apart with a quick movement to release the ball upon the release of said second trigger means.

3. The device described in claim 1 wherein second trigger means are provided to prevent the movement of said fingers away from each other until said resilient means is fully effective to separate said fingers, whereby said fingers are snapped apart with a quick movement to release the ball upon the release of said second trigger means; and means whereby said second trigger means are released by said first mentioned trigger in its movement.

4. A ball supporting and releasing mechanism comprising a plurality of releasing fingers movable between a first position where they are closely spaced to support a ball between them, and a second position wherein they are separated to allow the ball to drop freely; spring means having one position wherein it urges said fingers together, and a second position wherein it urges said fingers apart; and trigger means under the control of the operator for shifting said spring means from one position to the other.

5. The device described in claim 4 wherein second trigger means are provided to prevent the movement of said fingers until said spring has been substantially completely shifted to its said second position; and means whereby said second trigger means are released by said first mentioned trigger means in its movement.

6. The device described in claim 4 wherein the mechanism includes a magazine for containing balls for use in the device and wherein said trigger is provided with means to transfer a ball from said magazine and drop it upon said fingers while shifting said spring means back from said second position to said first position.

7. The device described in claim 4 wherein said trigger is moved by the operator to shift said spring to said second position; and return spring means are provided to return said trigger to its initial position.

THOMAS O. BRANDON.